(12) United States Patent
Yen

(10) Patent No.: US 7,742,159 B2
(45) Date of Patent: Jun. 22, 2010

(54) APPARATUS FOR CHECKING CONCENTRICITY BETWEEN LENS BARREL AND BARREL HOLDER

(75) Inventor: Shih-Chieh Yen, Taipei Hsien (TW)

(73) Assignee: Hon Hai Precision Industry Co., Ltd., Tu-Cheng, Taipei Hsien (TW)

(*) Notice: Subject to any disclaimer, the term of this patent is extended or adjusted under 35 U.S.C. 154(b) by 0 days.

(21) Appl. No.: 11/938,482

(22) Filed: Nov. 12, 2007

(65) Prior Publication Data

US 2008/0180669 A1 Jul. 31, 2008

(30) Foreign Application Priority Data

Jan. 26, 2007 (CN) .......................... 2007 1 0200120

(51) Int. Cl.
*G01B 9/00* (2006.01)
(52) U.S. Cl. .................. 356/127; 356/124; 359/704; 359/823
(58) Field of Classification Search .................. 356/124, 356/127, 399; 359/819, 425, 694, 703–704, 359/822–823, 826–827
See application file for complete search history.

(56) References Cited

U.S. PATENT DOCUMENTS 5,375,665 A * 12/1994 Fanchang et al. ............. 173/48
6,049,432 A * 4/2000 Machida et al. ............. 359/700
6,271,914 B1 * 8/2001 Frey et al. .................... 356/124
2007/0223110 A1 * 9/2007 Ge et al. ....................... 359/699
2008/0159729 A1 * 7/2008 Hong et al. .................. 396/133

FOREIGN PATENT DOCUMENTS

| CN | 1115391 A | 1/1996 |
| JP | H03-285785 A | 12/1991 |
| JP | 2000-19062 A | 1/2000 |
| JP | 2000-186976 A | 7/2000 |
| JP | 2005-221471 A | 8/2005 |
| JP | 2006-208175 A | 8/2006 |

* cited by examiner

*Primary Examiner*—Tarifur Chowdhury
*Assistant Examiner*—Michael Lapage
(74) *Attorney, Agent, or Firm*—Jeffrey T. Knapp

(57) ABSTRACT

An apparatus for checking concentricity between a barrel holder and a lens barrel rotatably engaging with the barrel holder is provided. The lens barrel includes at least one lens coaxially received therein. The apparatus includes a barrel holder retaining member, a rotating member, a driving unit, a light source, and an image sensor. The barrel holder retaining member is used for fixedly retaining the barrel holder in position. The rotating member is structured for meshing with the lens barrel. The driving unit is used for driving the rotating member to rotate, thereby rotates the lens barrel. The light source is configured for emitting light toward a first end of the lens barrel. The image sensor is arranged to face toward an opposite second end of the lens barrel. The image sensor is configured for sensing the light emitted from the light source.

13 Claims, 6 Drawing Sheets

APPARATUS FOR CHECKING CONCENTRICITY BETWEEN LENS BARREL AND BARREL HOLDER

BACKGROUND

1. Field of the Invention

The present invention relates to testing apparatuses, more particularly to an apparatus for checking concentricity between the lens barrel and the barrel holder.

2. Description of Related Art

With the ongoing development of microcircuitry and multimedia technology, digital cameras are now in widespread use. High-end portable electronic devices, such as mobile phones and PDAs (Personal Digital Assistants), are being developed to be increasingly multi-functional. Many of these portable electronic devices are now equipped with a digital camera. The camera generally includes an optical module.

Optical modules used for digital camera modules typically include a lens barrel, a lens module, a spacer, a filter, and a lens holder. The lens module, the spacer, and the filter are engagingly received in the lens barrel one on top of one another, in the order written. Generally, the lens barrel is mounted in the lens holder through thread grooves. In an assembly process of the optical module, checking concentricity between the lens barrel and the barrel holder is always needed.

Generally, a method for checking concentricity between the lens barrel and the barrel holder includes following steps: firstly, a light source is disposed at an object side of the optical module and an image sensor is disposed at an image side of the optical module; secondly, light beams emitted from the light source pass through the lens module to form a first spot on the image sensor, meanwhile the position of the spot is recorded; thirdly, the lens barrel is rotated at an angle relative to the lens holder by hand, and a second spot is formed on the image sensor; finally, a distance between the positions of the first spot and the second spot is measured and compared with a predetermined acceptable range to determine whether the concentricity will be accepted.

However, rotating the lens barrel by hand is inefficient and inaccurate due to man-made errors. Thus, the efficiency and precision for checking concentricity are decreased.

What is needed, therefore, is an apparatus for checking concentricity between the lens barrel and the barrel holder with high efficiency and precision.

SUMMARY

In a present embodiment of the present invention, an apparatus for checking concentricity between a barrel holder and a lens barrel rotatably engaging with the barrel holder is provided. The lens barrel includes at least one lens coaxially received therein. The apparatus includes a barrel holder retaining member, a rotating member, a driving unit, a light source, and an image sensor. The barrel holder retaining member is used for fixedly retaining the barrel holder in position. The rotating member is structured for meshing with the lens barrel. The driving unit is used for driving the rotating member to rotate, thereby rotates the lens barrel. The light source is configured for emitting light toward a first end of the lens barrel. The image sensor is arranged facing towards an opposite second end of the lens barrel. The image sensor is configured for sensing the light emitted from the light source.

Advantages and novel features will become more apparent from the following detailed description of the present apparatus for checking concentricity between lens barrel and barrel holder, when taken in conjunction with the accompanying drawings.

BRIEF DESCRIPTION OF THE DRAWINGS

Many aspects of the present apparatus for checking concentricity between lens barrel and barrel holder can be better understood with reference to the following drawings. The components in the drawings are not necessarily drawn to scale, the emphasis instead being placed upon clearly illustrating the principles of the present apparatus for checking concentricity between lens barrel and barrel holder. Moreover, in the drawings, like reference numerals designate corresponding parts throughout the several views.

DETAILED DESCRIPTION OF THE EMBODIMENT

Reference will now be made to the drawings to describe present embodiments of the present apparatus for checking concentricity between the lens barrel and the barrel holder.

Figure 1:
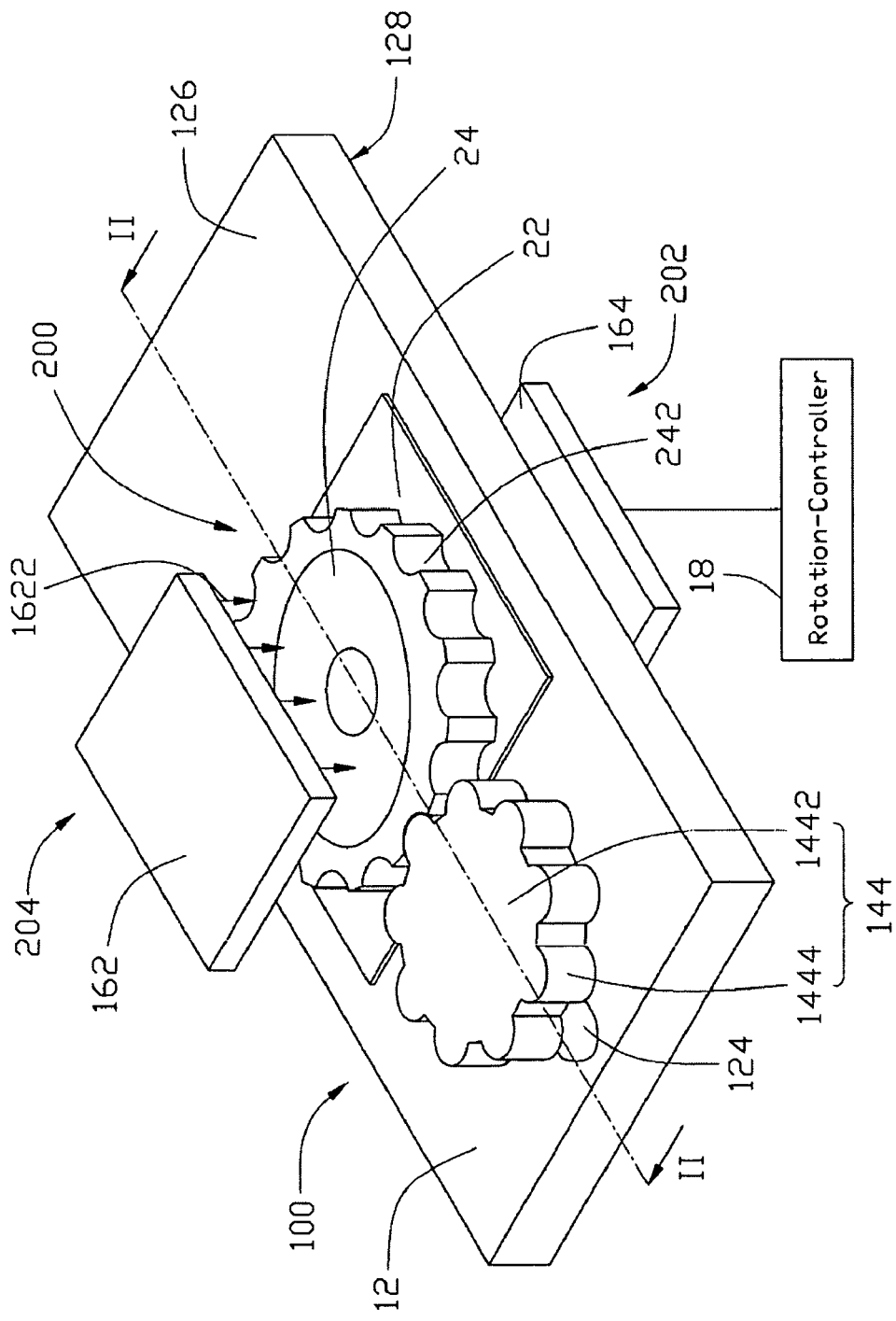
FIG. 1 is a schematic, isometric view of a concentricity checking apparatus and an optical module disposed therein in accordance with a first present embodiment, wherein the concentricity checking apparatus includes an image sensor.
Figure 2:
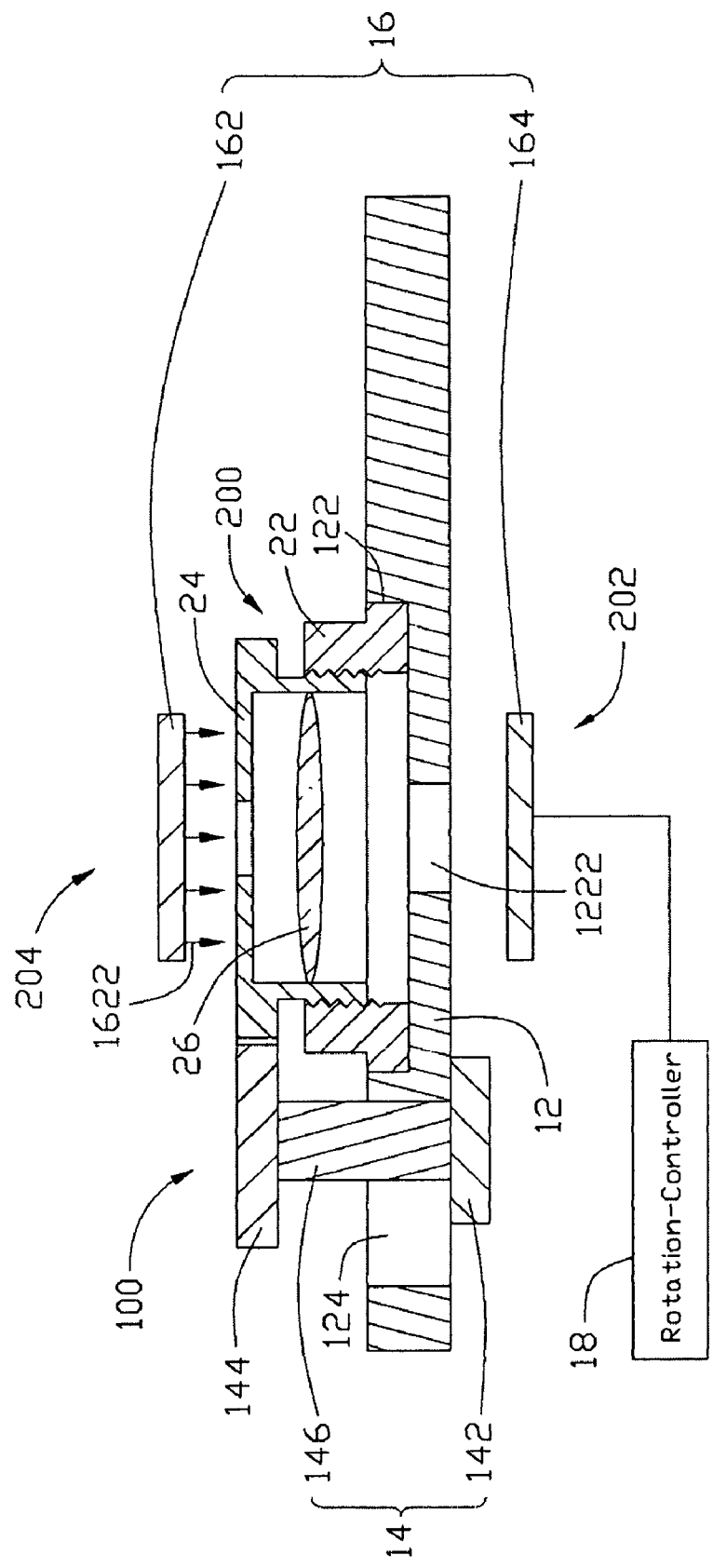
FIG. 2 is a schematic, cross-sectional of the concentricity checking apparatus along line II-II in FIG. 1.

Referring to FIGS. 1 to 2, a concentricity checking apparatus 100 and an optical module 200 are illustrated in accordance with a first present embodiment. The optical module 200 includes a barrel holder 22, a lens barrel 24 and a lens group 26. The lens group 26 is coaxially received in the lens barrel 24. The lens barrel 24 is rotatably engaged in the barrel holder 22 through thread grooves. A plurality of cutouts 242 is defined in a periphery of the lens barrel 24. Preferably, a distance between each two adjacent cutouts 242 is equal. The lens group 26 may include one or more lenses. In the present embodiment, the lens group 24 has one lens. An image side 202 and an object side 204 are defined at two opposite sides of the optical module 200. The concentricity checking apparatus 100 includes a platform 12, a rotating member 144, a driving unit 14 and a position-recording device 16. The concentricity checking apparatus 100 is used for checking concentricity between the principal axis of the lens barrel 24 and the principal axis of the barrel holder 22.

The platform 12 defines a recess 122 and a sliding slot 124 adjacent to the recess 122, both of which are at one surface 126 of the platform 12. The barrel holder 22 of the optical module 200 is received and retained in the recess 122. Generally, one end of the barrel holder 22 is cuboid-shaped. Correspondingly, the recess 122 is defined as cuboid-shaped and firmly contacts the barrel holder 22, thus the barrel holder 22 is fixedly retained in the recess 122. A through hole 1222, communicating with the recess 122, is defined in the platform 12.

The sliding slot 124 is defined in the platform 12 and extends in a radial direction from a center of the recess 122. The rotating member 144 is structured for meshing with the lens barrel 24, and is coupled to the driving unit 14. The rotating member 144 includes a cylinder-shaped post 1442 and a plurality of protuberances 1444 extending from a periphery thereof. The protuberances 1444 are configured for engaging with the cutouts 242 defined in the lens barrel 24. The driving unit 14 includes a motor 142 and motor shaft 146. Two opposite ends of the motor shaft 146 are coupled to the motor 142 and the rotating member 144 respectively, thus the driving unit 14 can rotate the rotating member 144. The motor shaft 146 extends through the sliding slot 124. The motor 142 and the rotating member 144 are adjacent to the two opposite surfaces 128 and 126 of the platform 12, respectively. The motor shaft 146 can slide in the sliding slot 124. The motor 142 can be selected from a group consisting of a stepping motor, a servomotor, a direct current motors, and so on. The driving unit 14 is configured for driving the rotating member 144 to rotate, and thereby rotates the lens barrel 24. When the rotating member 144 is engaged with the lens barrel 24, the driving unit 14 is fastened on the platform 12.

The driving unit 14 also includes a rotation-controller 18 for controlling the motor 142. Due to the rotation-controller 18, a rotation angle of the rotating member 144 can be controlled accurately. Thereby the rotation angle of the lens barrel 24 can be controlled accurately. The rotation-controller 18 may be a computer.

Figure 3:
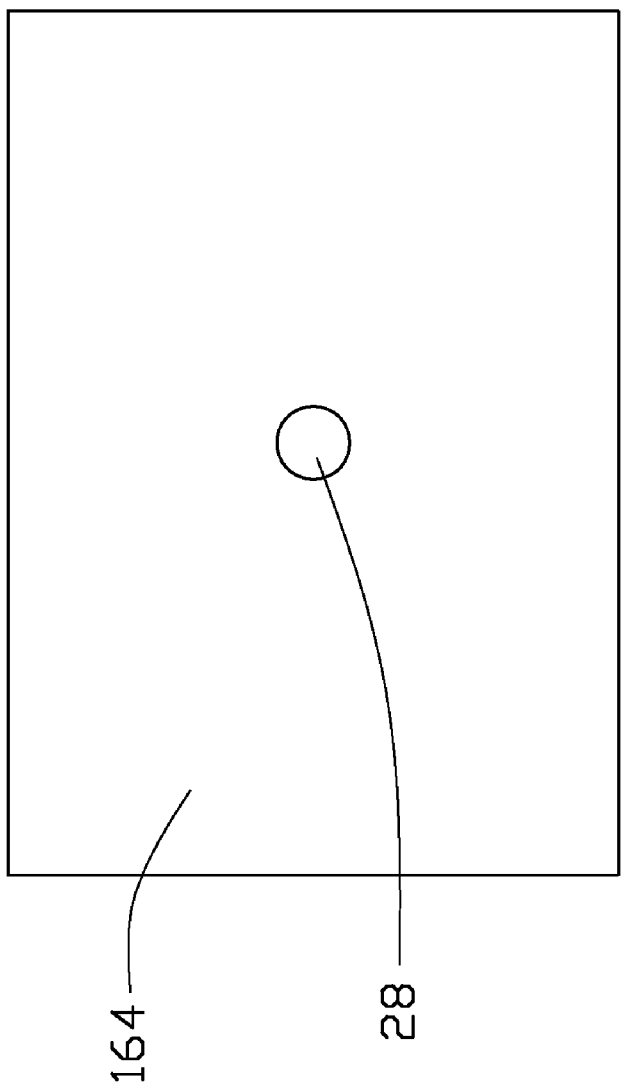
FIG. 3 is a schematic, plan view of the image sensor with a first light spot projected thereon.
Figure 4:
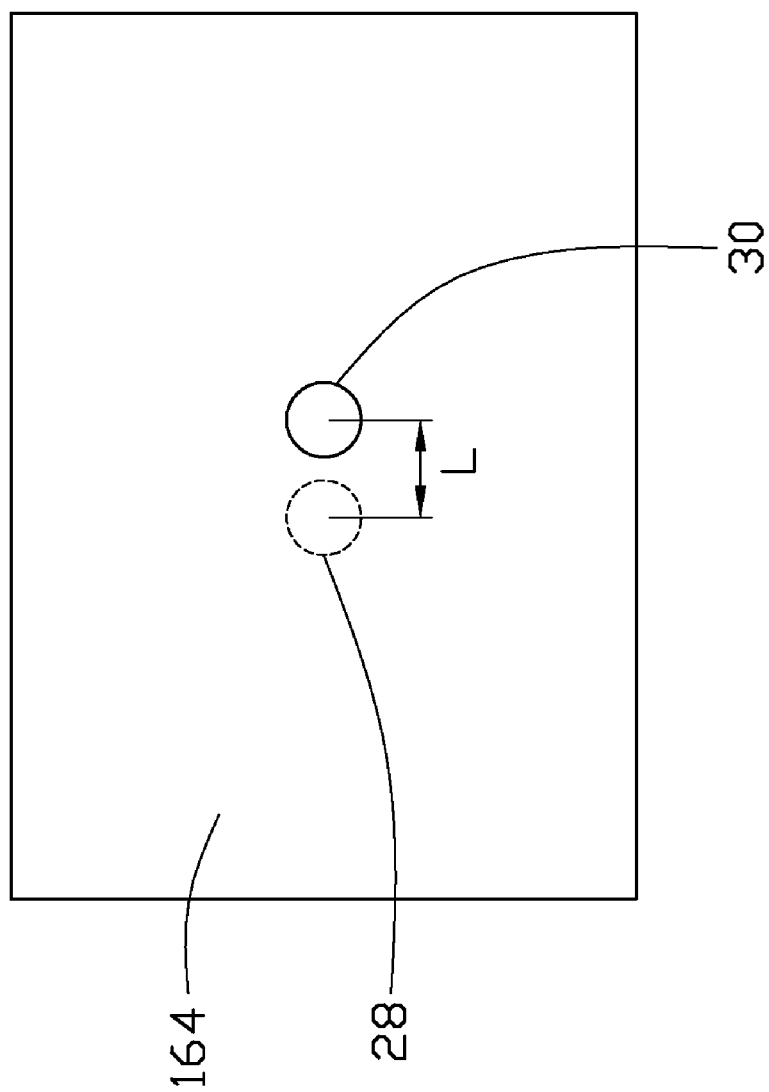
FIG. 4 is a schematic, plan view of the image sensor with the first light spot and a second light spot projected thereon.

The position-recording device 16 includes a light source 162 and an image sensor 164. The light source 162 and the image sensor 164 are disposed at the object side 204 and the image side 202 of the optical module 200, respectively. Generally, the image sensor 164 is disposed at a focal plane of the lens group 26. The light source 162 emits light beams 1622 toward an end of the lens barrel 24. The image sensor 164 is arranged facing toward an opposite end of the lens barrel 24. The light beams 1622 pass through the lens group 26 of the optical module 200 and are focalized. Then a light spot is formed, such as a light spot 28 as shown in FIG. 3. The image sensor 164 is configured for sensing the light spot. The image sensor 164 can be selected from a group consisting of a charge coupled device (CCD for short), a complementary metal oxide semiconductor element (CMOS element for short), and so on. In the present embodiment, an optical axis of the lens group 26 and the principal axis of the lens barrel 24 are coaxial, thus the light spot can characterize the principal axis of the lens barrel 24.

Referring to FIGS. 1 to 4, an exemplary method for checking the concentricity between the lens barrel 24 and the barrel holder 22 includes the steps in no particular order of:

disposing the optical module 200 in the recess 122;
disposing the light source 162 at an object side of the optical module 200;
disposing the image sensor 164 at an image side of the optical module;
starting the light source to emit light beams 1622, whereby the light beams 1622 pass through the lens group 26 and form a first light spot 28 on the image sensor 164;
recording a position of the first light spot 28 on the image sensor 164;
rotating the rotating member 144 via the driving unit 14 such that the lens barrel 24 is driven to rotate to a desired angle relative to the barrel holder 22, whereby a second light spot 30 is formed on the image sensor 164; and
recording a position of the second light spot 30 on the image sensor 164.

Finally, a distance L between positions of the first light spot 28 and the second spot 30 is measured and compared with a predetermined acceptable range. If the distance L is beyond the acceptable range, the concentricity of the lens barrel 22 and the barrel holder 22 is unacceptable. The position of the lens barrel 24 relative to the barrel holder 22 is then adjusted according to the distance L.

After checking the concentricity between the lens barrel 24 and the barrel holder 22, the rotation-driving device 14 can move away from the optical module 200 by sliding along the sliding slot 124. Then the optical module 200 is removed from the recess 122 and another optical module is disposed in the recess 122.

Also, the position recording device 16 can be replaced by other position recording device as long as the position of the principle axis of the lens barrel 24 can be recorded. The rotating member 144 also can be a regular prism with a plurality of protuberances extending around peripheral thereof. In addition, the sliding slot 124 can also be a groove, in which the driving unit 14 is disposed.

In the present embodiment, the concentricity checking apparatus 100 includes a driving unit 14 and a rotating member 144 that can automatically rotate the lens barrel 24 to a predetermined angle relative to the barrel holder 22. This can improve checking efficiency and decreases manpower, and thus reduces cost. Additionally, the rotation-controller 18 can control the rotation angle of the lens barrel 24 more accurately than by hand.

Figure 5:
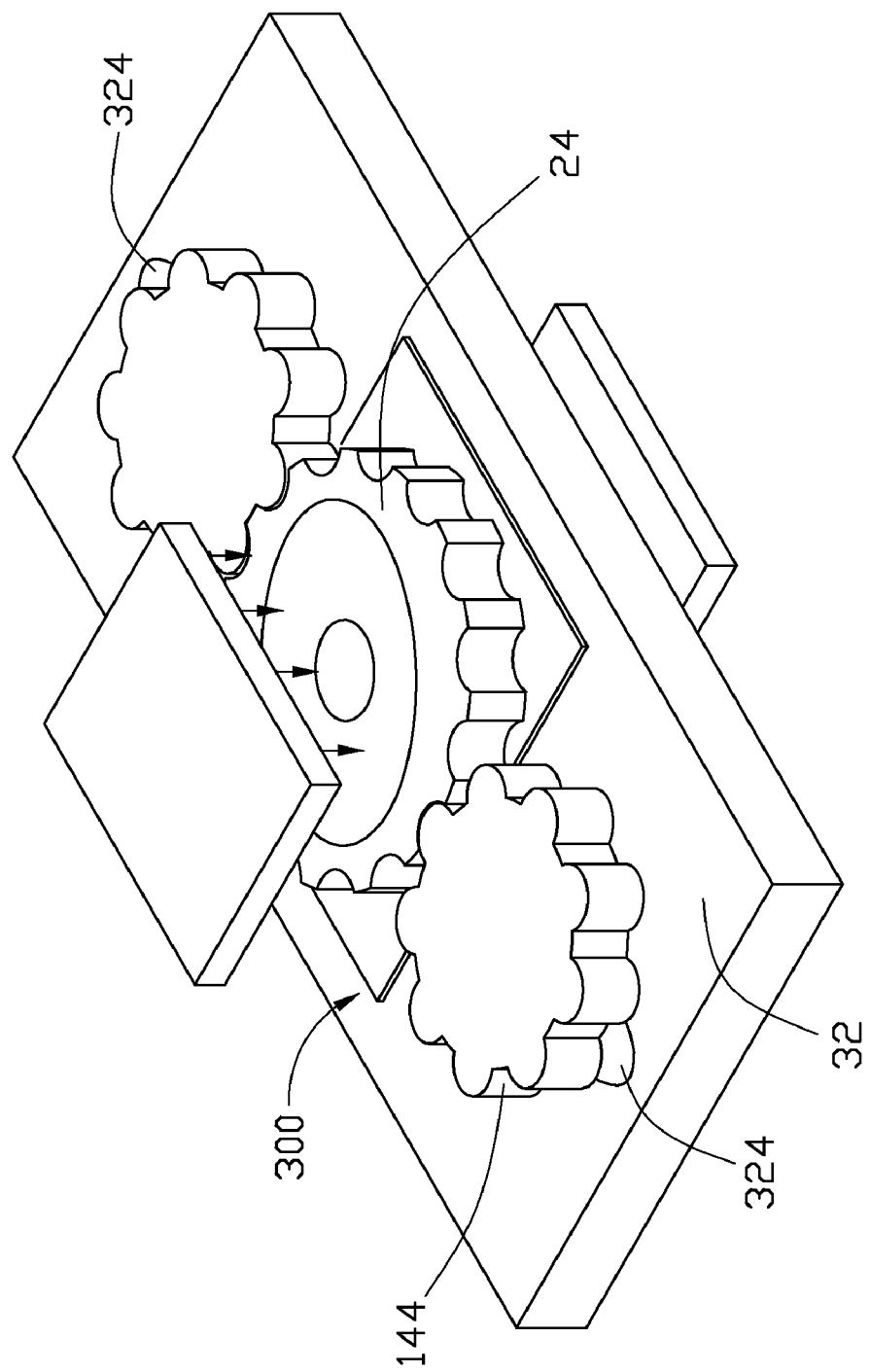
FIG. 5 is a schematic, isometric view of a concentricity checking apparatus in accordance with a second present embodiment.

Referring to FIG. 5, a concentricity checking apparatus 300 is illustrated according to a second present embodiment. The distinguishing features between the concentricity checking apparatuses 300 and 100 are that the concentricity checking apparatus 300 includes two driving units 14, two rotating members 144 and two sliding slots 324 defined in a stage 32. The two driving units 14 and two rotating members 144 are mounted at opposite sides of the recess 122. It is to be understood that the number of driving units 14 and rotating members 144 can also be three or more.

Figure 6:
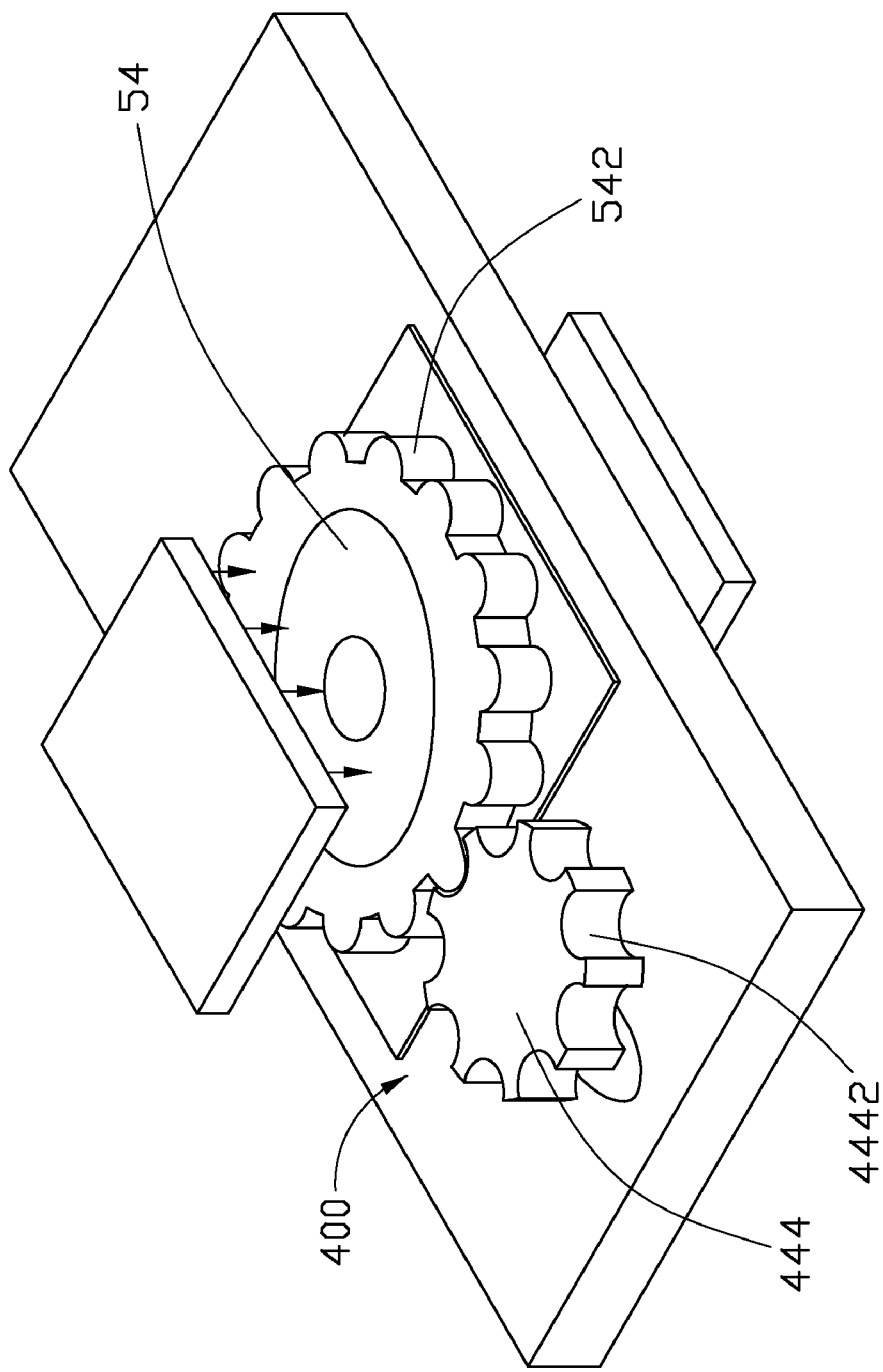
FIG. 6 is a schematic, isometric view of a concentricity checking apparatus in accordance with a third present embodiment.

Referring to FIG. 6, a concentricity checking apparatus 400 is illustrated according to a third present embodiment. Compared to the concentricity checking apparatus 100 of the first present embodiment, the distinguishing features are that the rotating member 444 of the concentricity checking apparatus 400 is a cylinder-shaped post with plurality cutouts 4442 defined in a periphery thereof. In this present embodiment, the concentricity checking apparatus 400 adapts to an optical module 500 including a lens barrel 54 with a plurality of protuberances 542 extending in a periphery thereof. Each of the protuberances 542 engagingly matches with each of the cutouts 4442. Also, the shape of the rotating member 444 can be changed corresponding to the lens barrel 54.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. An apparatus for checking concentricity between a barrel holder and a lens barrel rotatably engaged in the barrel holder, the lens barrel including at least one lens coaxially received therein, the apparatus comprising:

a barrel holder retaining member for fixedly retaining the barrel holder in position, wherein the barrel holder retaining member comprises a platform having a recess defined therein for engagingly receiving the barrel holder therein and a sliding slot adjacent to the recess, the sliding slot extending in a radial direction from a center of the recess;

a rotating member having an outer periphery meshing with an outer periphery of the lens barrel;

a driving unit coupled to the rotating member for driving the rotating member to rotate such that the lens barrel rotates correspondingly;

a light source for emitting light toward a first end of the lens barrel; and an image sensor for being arranged facing toward an opposite second end of the lens barrel, the image sensor being configured for sensing the light emitted from the light source.

2. The apparatus as described in claim 1, wherein the rotating member includes a cylinder-shaped post and a plurality of protuberances extending from an outer periphery of the cylinder-shaped post, the protuberances being configured for meshing with the outer periphery of the lens barrel.

3. The apparatus as described in claim 1, wherein the rotating member includes a cylinder-shaped post and a plurality of cutouts defined in an outer periphery of the cylinder-shaped post.

4. The apparatus as described in claim 1, wherein the driving unit includes a motor having a motor shaft slidably engaged in the sliding slot and coupled to the rotating member, and the motor shaft is capable of sliding along the sliding slot thereby driving the rotating member to move along the radial direction from the center of the recess.

5. The apparatus as described in claim 1, wherein the light source is configured for emitting parallel light beams toward the first end of the lens barrel.

6. The apparatus as described in claim 1, wherein the image sensor is disposed at a focal plane of the at least one lens.

7. The apparatus as described in claim 1, wherein an end of the barrel holder is cuboid-shaped and the recess is cuboid-shaped such that the barrel holder retaining member firmly contacts the barrel holder.

8. An apparatus for checking concentricity between a barrel holder and a lens barrel rotatably engaged in the barrel holder, the lens barrel including at least one lens coaxially received therein, the apparatus comprising:

a barrel holder retaining member configured for fixedly retaining the barrel holder in position, the barrel holder retaining member comprising a platform having a recess defined therein for engagingly receiving the barrel holder therein and a sliding slot adjacent to the recess, the sliding slot extending in a radial direction from the recess;

a rotating member structured and arranged for meshing with the lens barrel;

a driving unit coupled to the rotating member and configured for driving the rotating member to rotate and thereby rotate the lens barrel, the driving unit including a motor having a motor shaft slidably engaged in the sliding slot and coupled to the rotating member, the sliding of the motor shaft along the sliding slot being configured for driving the rotating member to move along a radial axis toward or away from the recess, the radial axis aligned with a center of the recess;

a light source configured for emitting light toward a first end of the lens barrel; and an image sensor capable of being arranged to facing toward an opposite second end of the lens barrel, the image sensor being configured for sensing the light emitted from the light source.

9. The apparatus as described in claim 8, wherein the rotating member includes a cylinder-shaped post and a plurality of protuberances extending from an outer periphery of the cylinder-shaped post, the protuberances being configured for meshing with an outer periphery of the lens barrel.

10. The apparatus as described in claim 8, wherein the rotating member includes a cylinder-shaped post and a plurality of cutouts defined in an outer periphery of the cylinder-shaped post.

11. The apparatus as described in claim 8, wherein the light source is configured for emitting parallel light beams toward the first end of the lens barrel.

12. The apparatus as described in claim 8, wherein the image sensor is disposed at a focal plane of the at least one lens.

13. The apparatus as described in claim 8, wherein an end of the barrel holder is cuboid-shaped and the recess is cuboid-shaped such that the barrel holder retaining member firmly contacts the barrel holder.

* * * * *